United States Patent [19]
Kang et al.

[11] Patent Number: 5,669,568
[45] Date of Patent: Sep. 23, 1997

[54] BRAKE DEVICE FOR A MAGNETIC RECORDING AND REPRODUCING APPARATUS

[75] Inventors: Myung Goo Kang, Seoul; Seong Sik Kang; Sung Hoon Choi, both of Kyungki-Do; Mun Chea Joung, Seoul; Byoung Gyu Jang, Kyungki-Do; Kye Yeon Ryu; Hyo Chong Yu, both of Seoul; Sang Jig Lee, Kyungki-Do, all of Rep. of Korea

[73] Assignee: Goldstar Co., Ltd., Seoul, Rep. of Korea

[21] Appl. No.: 593,488

[22] Filed: Jan. 30, 1996

Related U.S. Application Data

[62] Division of Ser. No. 421,028, Apr. 13, 1995, Pat. No. 5,511,737, which is a continuation of Ser. No. 73,600, Jun. 9, 1993, abandoned.

[30] Foreign Application Priority Data

Jun. 17, 1992 [KR] Rep. of Korea ............... 10706/1992
Jun. 17, 1992 [KR] Rep. of Korea ............... 10709/1992
Jun. 23, 1992 [KR] Rep. of Korea ............... 10921/1992

[51] Int. Cl.$^6$ ............... G11B 15/32; G11B 5/027; G11B 5/008
[52] U.S. Cl. ............... 242/355.1; 242/422.4; 360/83; 360/90
[58] Field of Search ............... 242/355.1, 422.4, 242/156.2, 355.2; 360/96.1, 96.3, 90, 83

[56] References Cited

U.S. PATENT DOCUMENTS

| | | | |
|---|---|---|---|
| 4,801,107 | 1/1989 | Dixon et al. | 242/338.3 |
| 4,985,788 | 1/1991 | Kano et al. | 360/85 |
| 5,188,311 | 2/1993 | Choi | 242/355.1 |

OTHER PUBLICATIONS

Patent Abstract of Japan No. HEI 2–14450 P–1027 Mar. 20, 1990, vol. 14, No. 158.

*Primary Examiner*—John Q. Nguyen

[57] ABSTRACT

A brake device for magnetic recording and reproducing apparatus, such as a slide loading type camera recorder. The supply reel brake unit includes a supply reel brake having an operating pin, and a mode switch gear having an operating protrusion pushing the operating pin in a tape running mode, thereby releasing the tape supply reel table. In addition, the supply reel brake unit may comprise a drive cam gear, a supply reel brake cooperating with the drive cam gear to selectively brake the tape supply reel table. The take-up reel brake unit includes a clutch gear engaging with the reel gear of the tape take-up reel table, a take-up reel brake having a rotation limit lever limiting the rotation of the brake in cooperation with the guide pin of the stationary base plate, a latch of the brake selectively engaging with the reel gear of the tape take-up reel table to brake the take-up reel table, and a stop pin of the take-up reel brake received by the slit of the slide base to separate the latch of the brake from the reel gear of the tape take-up reel table in a tape loading operation, thereby releasing the tape take-up reel table.

15 Claims, 10 Drawing Sheets

BRAKE DEVICE FOR A MAGNETIC RECORDING AND REPRODUCING APPARATUS

This application is a divisional of application Ser. No. 08/421,028, filed on Apr. 13, 1995, U.S. Pat. No. 5,511,737 which is a Rule 62 continuation of Ser. No. 08/073,600 filed Jun. 9, 1993, now abandoned, the entire contents of which are hereby incorporated by reference.

BACKGROUND OF THE INVENTION

1. Field of the Invention

The present invention relates in general to a brake device for a magnetic recording and reproducing apparatus, such as a slide loading type camera recorder, and more particularly to a brake device for selectively braking a supply reel table and a take-up reel table in changing of varieties of modes of the magnetic recording and reproducing apparatus.

2. Description of the Prior Art

Conventionally, a slide loading type camera recorder, so to speak a slide loading type camcorder, includes a brake device having a tape supply reel brake provided at a side of a tape supply reel table of a slide base. The supply reel brake brakes or releases the tape supply reel table when the operational mode of the apparatus is changed between a tape running mode, such as a playback mode, a review mode, a high speed wind mode or a search mode, and a tape running stop mode, such as a cassette housing eject mode or a power save mode.

However in the conventional brake device, the tape supply reel brake has a complicated construction. Hence, the brake device deteriorates the assembly ability and the productivity, thus increasing the manufacturing cost and achieving no compactness.

On the other hand, there has been proposed a brake device having a take-up reel brake and braking the take-up reel table by operating the take-up reel brake using a clutch mechanism. However, the conventional take-up reel brake should be provided with a complicated braking mechanism, which is necessarily provided to brake the take-up reel table in the tape loading mode. Moreover, the take-up reel brake may not accurately engage with a reel gear of the take-up reel table at the initial stage of the review mode. The desired braking of the take-up reel table by the take-up reel brake thus instantaneously fails, thereby causing the magnetic tape to stray from a predetermined tape running path and resulting in a damage of the tape.

SUMMARY OF THE INVENTION

It is, therefore, an object of the present invention to provide a brake device for magnetic recording and reproducing apparatus in which the aforementioned problems can be overcome, and which includes a supply reel brake, a brake operating pin fixed to the supply reel brake and an operating unit provided at a mode switch gear, and makes the supply reel brake cooperate with the mode switch gear in such a manner that the operating unit cooperates with the brake operating pin in a tape running mode so as to release the tape supply reel table.

It is another object of the present invention to provide a brake device for magnetic recording and reproducing apparatus which comprises a drive cam gear rotatably mounted on the rear section of a stationary base plate of a deck mechanism, a tape supply reel brake rotatably mounted on a slide base and controlling, in cooperation with the drive cam gear, the rotational operation of the tape supply reel table in varieties of modes, and an elastic biasing member biasing the supply reel brake to a position.

It is a further object of the present invention to provide a brake device for magnetic recording and reproducing apparatus which includes a take-up reel brake of a simple construction which engages with a reel gear of a tape take-up reel table without failure at the initial stage of a mode, so that the desired braking of the take-up reel table by the take-up reel brake is thus achieved at once, thereby imparting a backward tensile force to the tape, resulting in stabilization of the tape by preventing straying of the tape from the predetermined tape running path.

In an aspect, a brake device for magnetic recording and reproducing apparatus according to an embodiment of the present invention comprises a supply reel brake rotatably mounted on a slide base to normally brake a tape supply reel table and having an operating pin; and a mode switch gear rotatably mounted on the lower surface of a stationary base plate and having an operating protrusion pushing the operating pin of the supply reel brake in a tape running mode, thereby releasing the tape supply reel table.

In another aspect, the brake device comprises a drive cam gear rotatably mounted on the rear section of the slide base; a supply reel brake rotatably mounted on the slide base to cooperate with the drive cam gear and to selectively brake the tape supply reel table in accordance with a variety of operational modes of the apparatus; and a biasing member for the supply reel brake.

In still another aspect, the brake device comprises a clutch gear rotatably mounted on a shaft of the slide base to engage with the reel gear of the tape take-up reel table; a take-up reel brake rotatably mounted on the shaft of the clutch gear such that it is disposed on the clutch gear and tightened by a biasing member to compress the clutch gear, the brake being provided at an end thereof with a rotation limit lever adapted for limiting the rotation of the brake in cooperation with a guide pin of the stationary base plate; a latch provided at the other end of the brake to selectively engage with the reel gear of the tape take-up reel table so as to brake the take-up reel table; and a stop pin mounted on the lower surface of the other end of the take-up reel brake, the stop pin being received by a slit of the slide base to separate the latch of the brake from the reel gear of the tape take-up reel table in a tape loading operation, thereby releasing the tape take-up reel table.

BRIEF DESCRIPTION OF THE DRAWINGS

The above and other objects, features and other advantages of the present invention will be more clearly understood from the following detailed description taken in conjunction with the accompanying drawings, in which:

FIGS. 6A and 6B are schematic views showing operations of the take-up reel brake unit of the present invention, respectively, in which:

FIG. 6A shows the brake unit in a brake release position; and

FIG. 6B shows the brake unit in a braking position;

FIGS. 9 to 12 are views showing operations of the tape supply reel brake unit of FIG. 7, respectively, in which:

FIG. 9 is a plan view of the supply reel brake unit just before reaching a slide end position of the slide base;

FIG. 10 is a plan view of the supply reel brake unit in the slide end position of the slide base;

FIG. 11 is a plan view of the supply reel brake unit in a power save mode; and

FIG. 12 is a plan view of the supply reel brake unit in a playback mode.

DESCRIPTION OF THE PREFERRED EMBODIMENTS

Figure 1A:
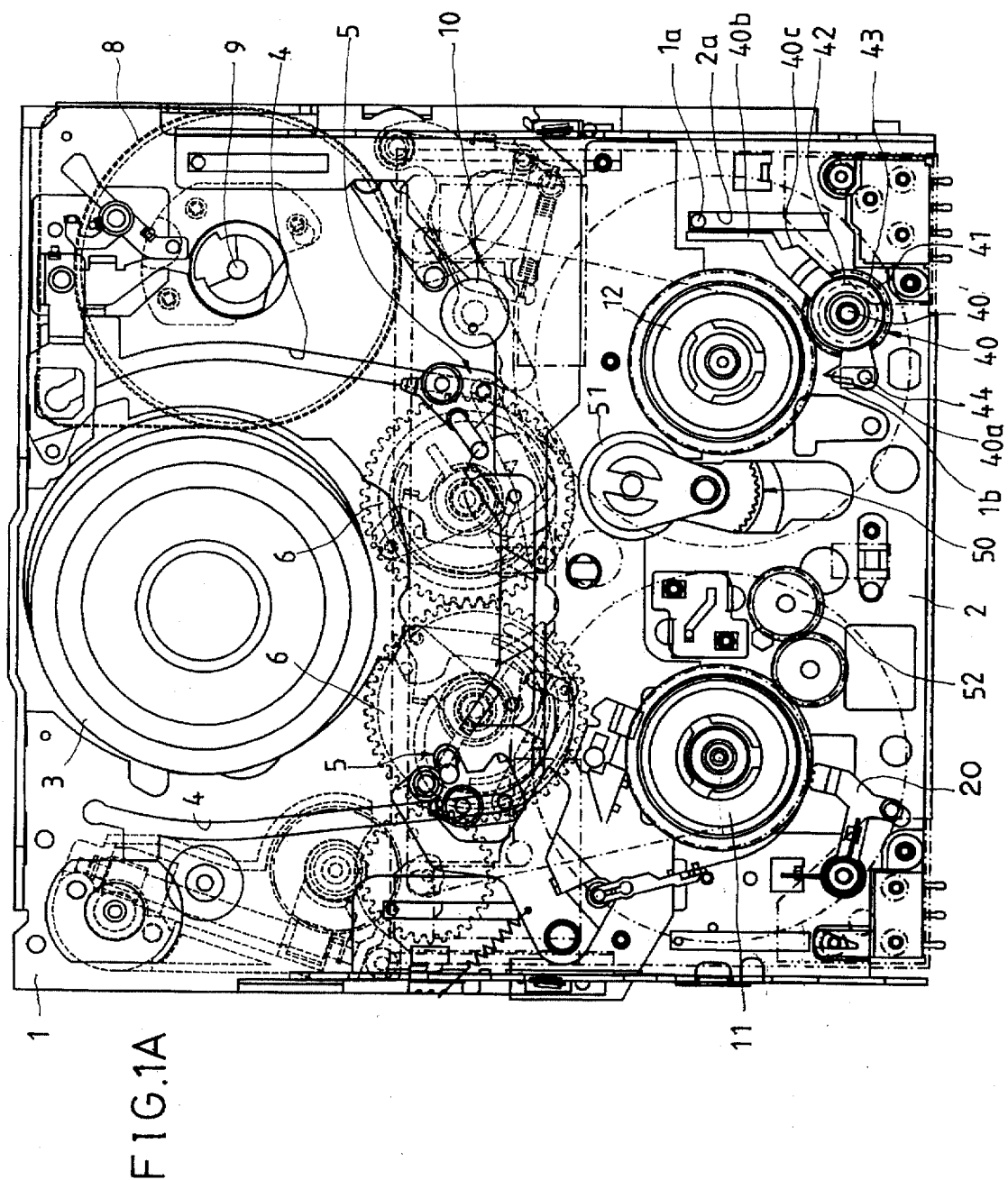
FIGS. 1A and 1B are plan views of a deck mechanism of a magnetic recording and reproducing apparatus having a brake device comprising a supply reel brake unit and a take-up reel brake unit in accordance with the present invention in a tape unloading position and in a tape loading end position, respectively.
Figure 1B:
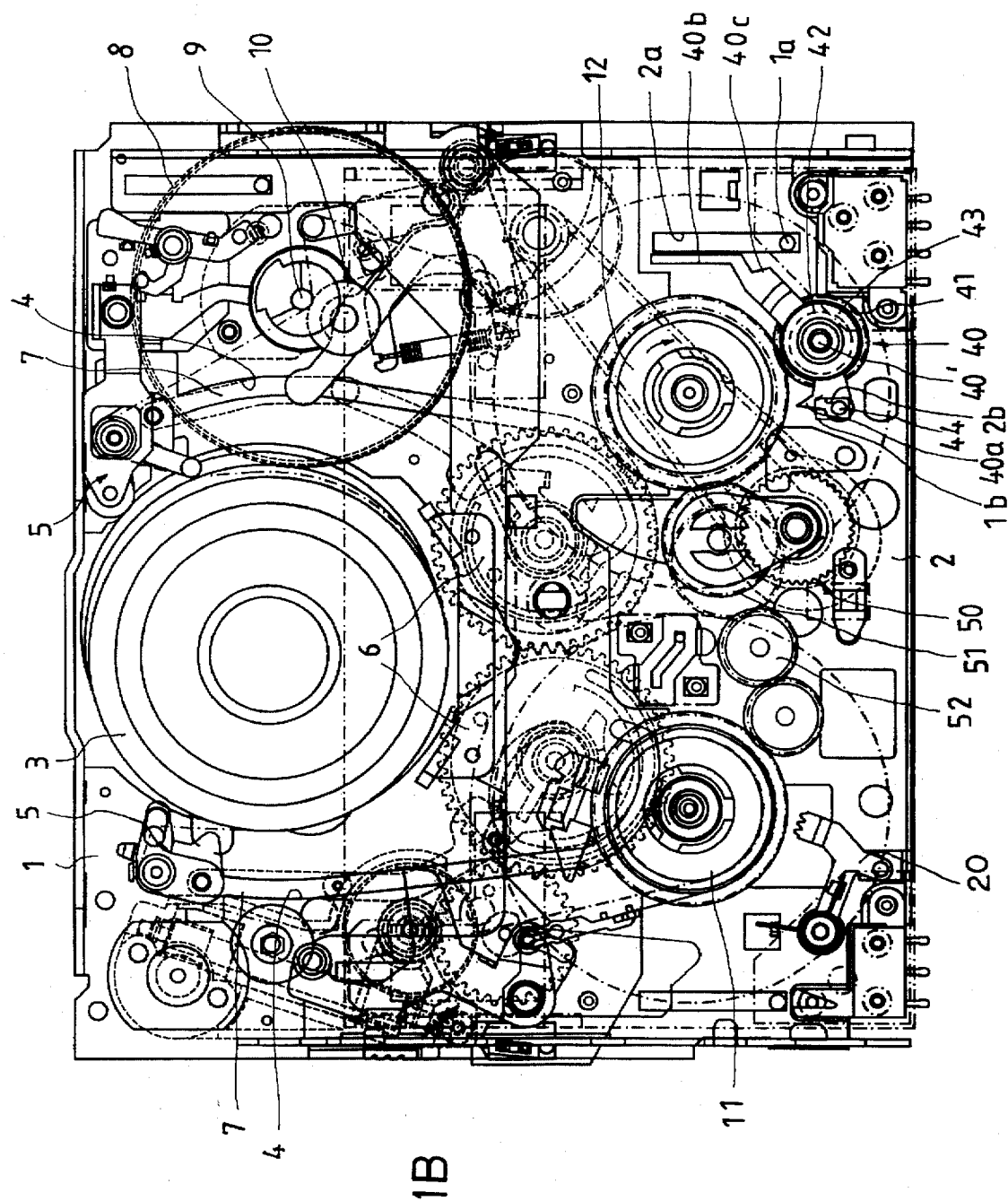
Figure 2:
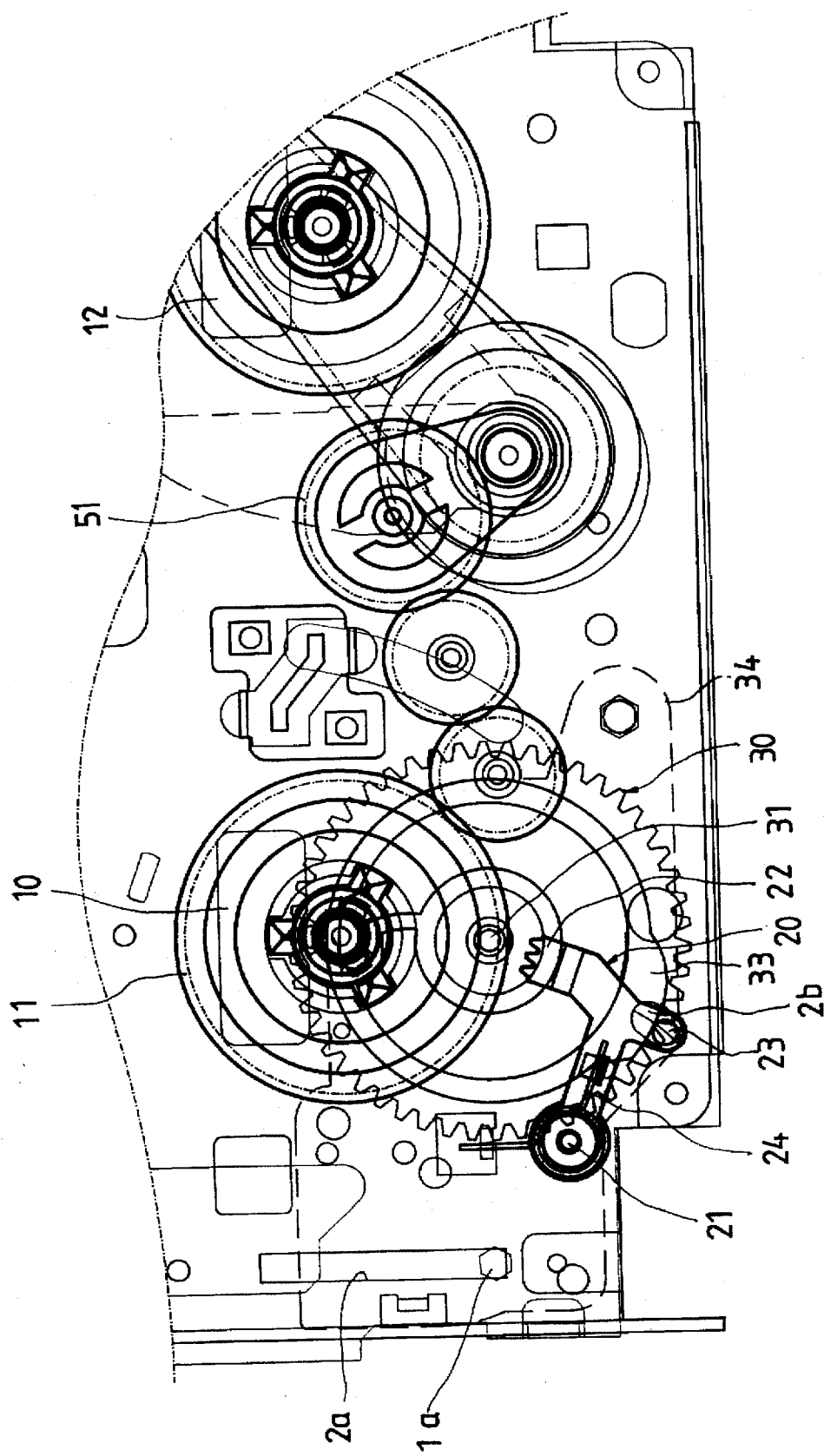
FIG. 2 is a partial plan view of the deck mechanism having the supply reel brake unit of the brake device of the present invention in the loading end position.

With reference to FIGS. 1A, 1B and 2, there is shown a deck mechanism of a magnetic recording and reproducing apparatus having a brake device comprising a tape supply reel brake unit in accordance with the present invention, while FIG. 1A shows a tape unloading position and FIGS. 1B and 2 show a tape loading end position. As shown in these drawings, a slide base 2 is movably mounted on a stationary base plate 1 such that it is reciprocated frontwards and backwards within a predetermined distance range. A rotary head drum 3 is slantingly mounted on the stationary base plate 1. At opposite sides of the rotary head drum 3 on the stationary base plate 1, a pair of loading guide slits 4 are provided to guide frontward and backward movement of individual slant post assemblies 5.

A pair of loading gears 6 engaging with each other are mounted on the lower surface of the stationary base plate 1 at the front of the rotary head drum 3. Each of the loading gears 6 is connected to a corresponding slant post assembly 5 through a link type loading arm 7. In this regard, when the loading gears 6 are rotated by a loading motor, the loading arm 7 makes the slant post assembly 5 move under the guide of the loading guide slit 4 by transmitting the rotational force of the loading gear 6 to the slant post assembly 5.

The slide base 2 is provided thereon with a tape supply reel table 11 and a tape take-up reel table 12. The slide base 2 further includes a supply reel brake unit and take-up reel brake unit which are provided at the tape supply reel table 11 and the tape take-up reel table 12, respectively. The supply reel brake unit has a supply reel brake 20 while the take-up reel brake unit has a take-up reel brake 40. In addition, a mode switch gear 30 is mounted on the lower surface of the stationary base plate 1 and cooperates with the loading gears 6 as shown in FIG. 2.

Between the two reel tables 11 and 12 of the slide base 2, an idle mechanism 50 is provided so as to transmit the rotational force of a capstan motor 8 and rotate one of the reel tables 11 and 12.

The idle mechanism 50 is applied with the rotational force of the capstan motor 8 and makes its output gear 51 engage with an intermediate gear train 52, which in turn gears with the tape supply reel table 11, or directly engage with the tape take-up reel table 12, thereby rotating one of the reel tables 11 and 12.

The supply reel brake 20 is rotatably mounted on the slide base 2 such that it is rotated about its shaft 21 and provided at one end thereof with a latch 22 which is to latch to a reel gear 11a of the tape supply reel table 11 to brake the reel table 11. The supply reel brake 20 is biased counterclockwise by a torsion spring 24 mounted about the shaft 21.

The mode switch gear 30 is mounted on the lower surface of the stationary base plate 1 such that it is rotated about a shaft 31 as shown in FIG. 2.

The lower surface of the mode switch gear 30 comes into contact with a terminal pattern of a printed circuit board 34 and senses varieties of functions of the deck mechanism.

In the above deck mechanism, the supply reel brake 20 is provided with an operating pin 23 which penetrates an operating hole 2b of the slide base 2 to protrude downwards as best seen in FIG. 2. The mode switch gear 30 includes an operating protrusion 33 which pushes the operating pin 23 of the supply reel brake 20 in a tape running mode, such as a playback mode.

In the drawings, the reference numeral 1a denotes a guide pin which is fixed to the stationary base plate 1 and inserted in a guide slit 2a of the slide base 2, thereby guiding the linear reciprocation of the slide base 2 with respect to the stationary base plate 1. The reference numeral 9 denotes an output shaft of the capstan motor 8, and the reference numeral 10 denotes a pinch roller which comes into tight and rotatable contact with the output shaft 9 of the capstan motor 8 to transmit the rotational force of the capstan motor 8 to the tape in the tape loading position and to feed the tape.

In the case of the tape unloading mode or the eject mode shown in FIG. 1A, the supply reel brake 20 is biased counterclockwise by the torsion spring 24 such that its latch 22 engages with the reel gear 11a of the supply reel table 11, thereby braking the tape supply reel table 11. In this tape unloading mode, a tape cassette is loaded on the slide base 2 such that its tape supply reel and its tape take-up reel engage with the supply reel table 11 and the take-up reel table 12 of the slide base 2, respectively. Thereafter, the slide base 2 along with the tape cassette is moved from the unloading position shown in FIG. 1A to the loading position shown in FIGS. 1B and 2. During the backward movement of the slide base 2 from the unloading position of FIG. 1A to the loading position of FIGS. 1B and 2, the rotation of the loading gears 6 is continued and this makes the mode switch gear 30 cooperating with the loading gears 6 be rotated. As a result of the rotation of the mode switch gear 30, the operating protrusion 33 of the mode switch gear 30 is rotated to push the operating pin 23 of the supply reel brake 20. Hence, the supply reel brake 20 is rotated from the position shown in FIG. 1A to the position shown in FIGS. 1B and 2, thereby releasing the supply reel table 11. A tape running mode, such as the playback mode, is performed at this brake release position.

In order to change the tape running mode into a power save mode for temporarily stopping the tape running mode, the loading motor is temporarily rotated in the reversed direction and causes the mode switch gear 30 to be rotated in the reversed direction. The latch 22 of the supply reel brake 20 thus engages with the reel gear 11a of the tape supply reel table 11, thereby braking the supply reel table 11.

As described above, the supply reel brake unit of the brake device of the present invention has a simple construction. That is, the supply reel brake unit comprises the operating protrusion 33 of the mode switch gear 30 and the operating pin 23 of the supply reel brake 20 cooperating with the operating protrusion 33, and brakes or releases the tape supply reel table 11 in accordance with modes of the magnetic recording and reproducing apparatus. In this regard, the supply reel brake unit achieves the recent trend of compactness of the apparatus and reduces the manufacturing cost.

Figure 4:
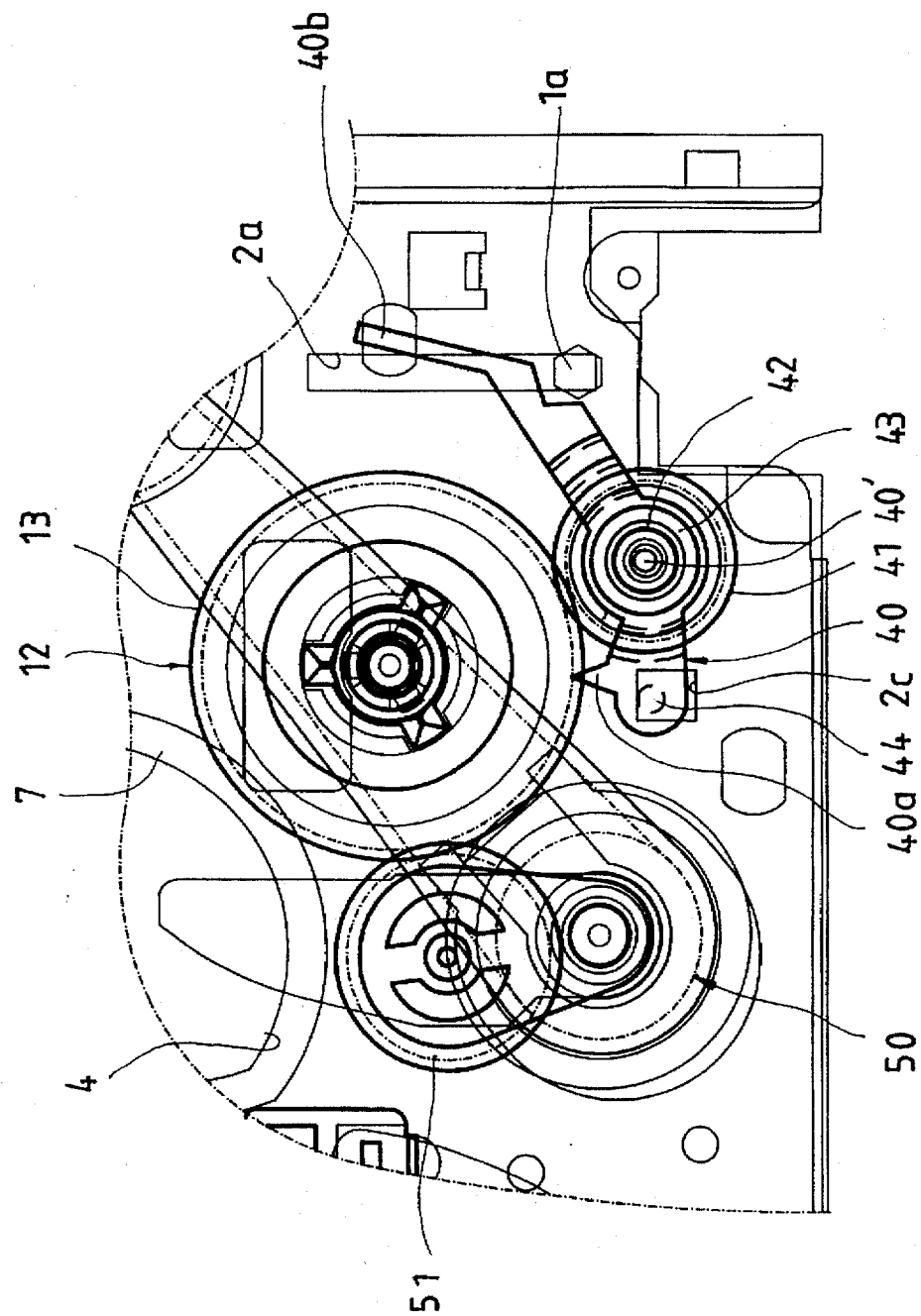
FIG. 4 is an enlarged plan view of the take-up reel brake unit of the present invention in a breaking position.
Figure 5:
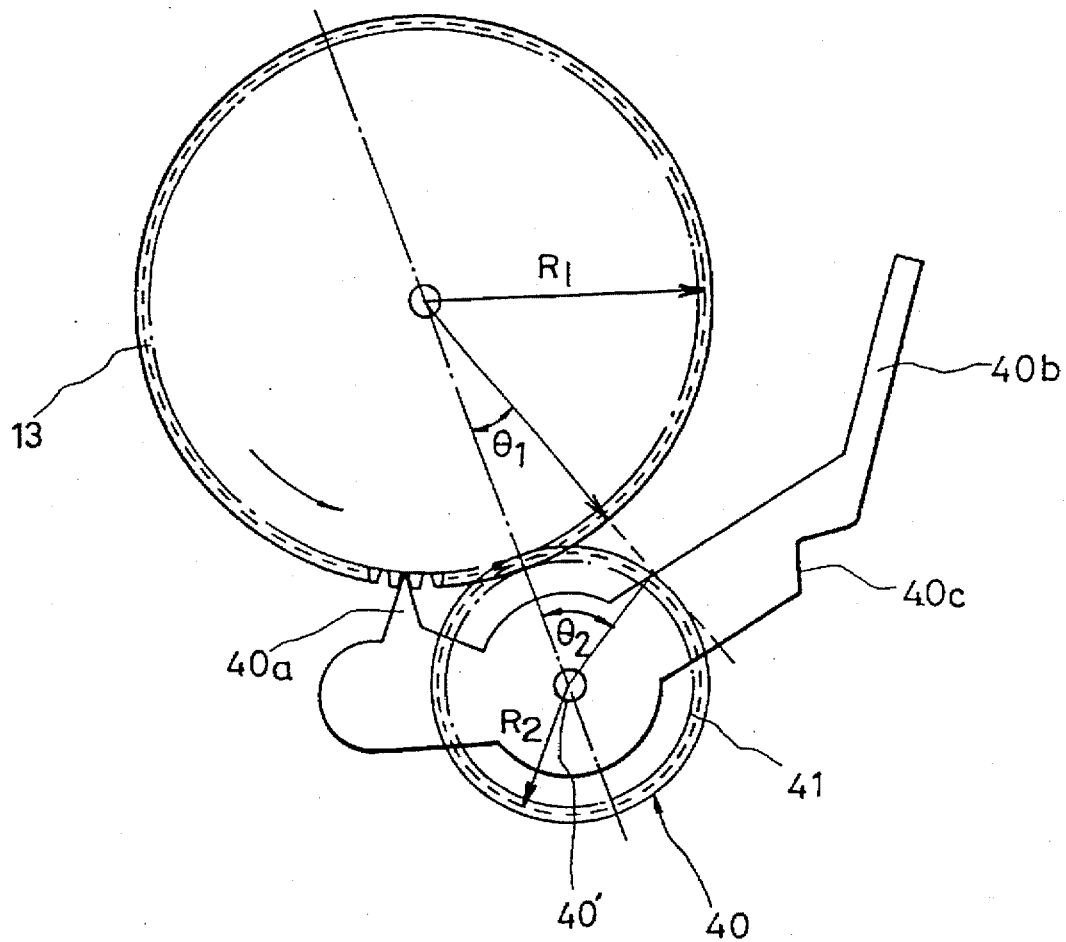
FIG. 5 is an enlarged plan view showing the relative position between the take-up reel brake unit of the present invention and a reel gear of a tape take-up reel table.

Turning to FIGS. 4 and 5, there is shown a take-up reel brake unit of the brake device of the present invention. The take-up reel brake unit includes the take-up reel brake 40 which is rotatably mounted on the slide base 2 such that it is rotated about a shaft 40'. A clutch gear 41 engaging with the reel gear 13 of the tape take-up reel table 12 is mounted on the shaft 40' such that it is disposed under the take-up reel brake 40. The take-up reel brake unit further includes a clutch spring 42, preferably a conical spring, which is mounted on the top of the brake 40. A cap 43 is mounted on the upper section of the shaft 40' such that it is tightened by a washer to press down the clutch gear 41.

The take-up reel brake 40 is provided at one end thereof with a latch 40a which is to selectively engage with a reel gear 13 of the tape take-up reel table 12 so as to brake the reel table 12. The take-up reel brake 40 is also provided at the other end thereof with a rotation limit lever 40b. In addition, a bolt hole 40c is formed at the front section of the limit lever 40b.

When the take-up reel table 12 is rotated along with the clutch gear 41 at the state shown in FIG. 4, the take-up reel brake 40 is rotated in the same direction as the rotating direction of the clutch gear 41 due to the clutching force of the clutch gear 41.

Otherwise stated, both the clutch gear 41 and the take-up reel brake 40 are rotated in the same direction such that when the clutch gear 41 is rotated in the counterclockwise direction, the take-up reel brake 40 is rotated in the counterclockwise direction, while when the clutch gear 41 is rotated in the clockwise direction, the take-up reel brake 40 is rotated in the clockwise direction.

The slide base 2 is provided with a slit 2c which receives a stop pin 44 fixed to the lower surface of one end of the take-up reel brake 40. The stop pin 44 limits, in cooperation with the slit 2c of the slide base 2, the rotating range of the take-up reel brake 40 within a predetermined range.

Figure 3:
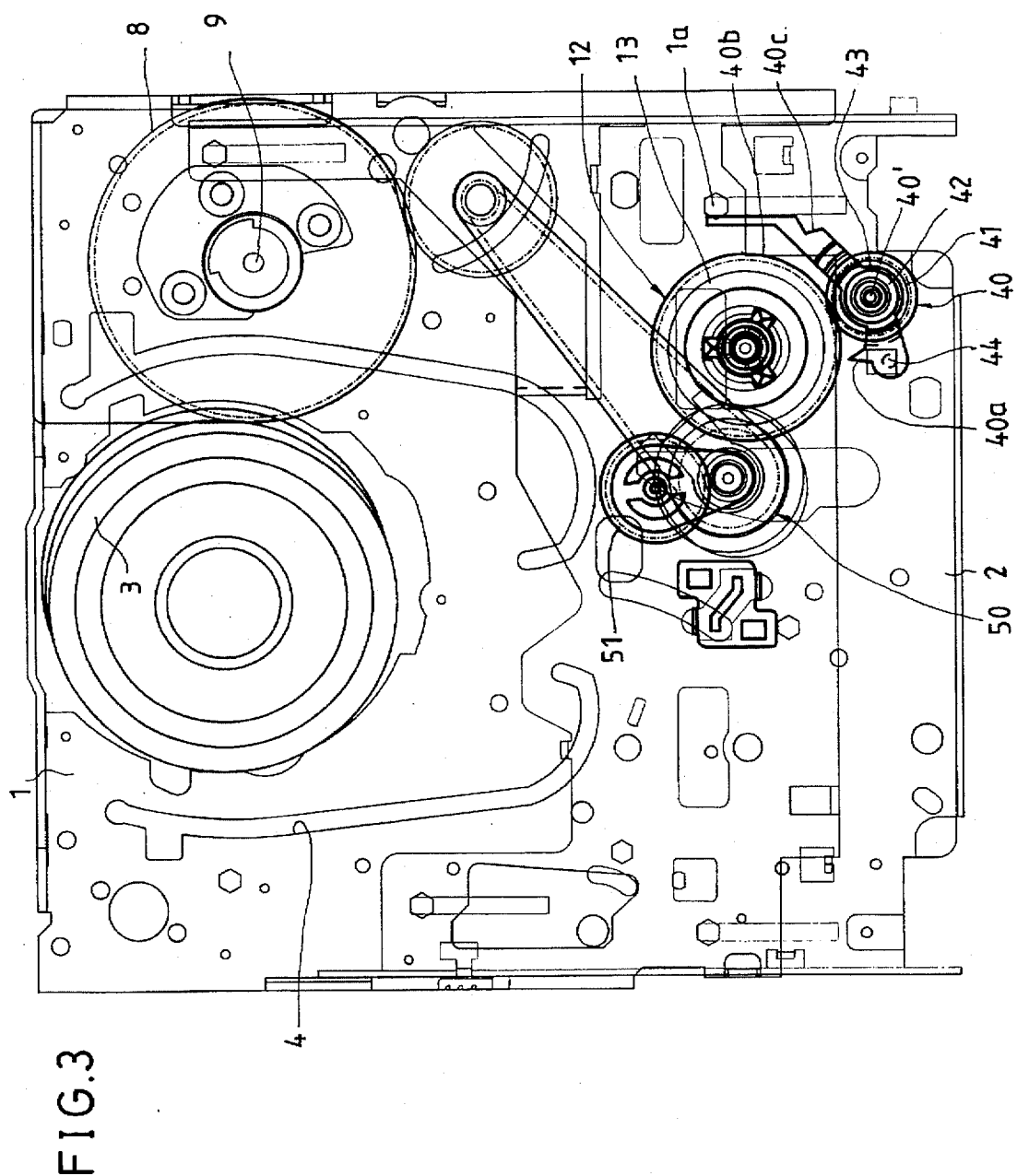
FIG. 3 is an enlarged plan view of the deck mechanism having the take-up reel brake unit of the brake device of the present invention in a break release position.

At the unloading mode or the eject mode shown in FIGS. 1A and 3, the take-up reel brake 40 releases the tape take-up reel table 12 since the rotation limit lever 40b contacts with the guide pin 1a of the stationary base plate 1 to limit the rotation of the take-up reel brake 40. Otherwise stated, in the case of the unloading mode shown in FIG. 1A, the supply reel brake 20 brakes the supply reel table 11 but the take-up reel brake 40 releases the take-up reel table 12.

When the loading mode is performed under the condition that the supply reel and the take-up reel of the tape cassette are loaded on the supply reel table 11 and the take-up reel table 12 of the slide base 2, respectively, the slide base 2 linearly moves backwards with respect to the stationary base plate 1. At the same time of the backward movement of the slide base 2, the pair of slant post assemblies 5 move backwards along the loading guide slits 4 by the rotational force of the loading gears 6 while taking the tape out of the tape cassette to the tape loading position. At this time, the tape supply reel table 11 is braked while the tape take-up reel table 12 is released, so that the take-up reel table 12 is rotated by the pulling force generated when the slant post assemblies 5 take the tape to the tape loading position and allows the tape to be taken out of the take-up reel of the tape cassette.

While the slant post assemblies 5 move backwards while taking the tape out of the tape cassette to the tape loading position, the backward movement of the slide base 2 with respect to the stationary base plate 1 is continued. The guide slit 2a of the slide base 2 thus moves backwards under the guide of the guide pin 1a of the stationary base plate 1 such that the guide pin 1a is located at the front end of the guide slit 2a of the slide base 2 when the tape loading operation is finished as shown in FIG. 4. At this state, the rotation limit lever 40b of the take-up reel brake 40 is spaced apart from the guide pin 1a, so that the take-up reel brake 40 is rotated about the shaft 40' clockwise or counterclockwise in accordance with a rotational direction of the take-up reel table 12. At this time, the latch 22 of the supply reel brake 20 separates from the reel gear 11a of the supply reel table 11 as described above, thereby releasing the supply reel table 11. Here, due to the bolt hole 40c provided at the front section of the rotation limit lever 40b, the rotation limit lever 40b is rotated clockwise about the shaft 40' without interference with the guide pin 1a of the stationary base plate 1.

When the operating mode of the apparatus is changed into the playback mode at the tape loading end position shown in FIGS. 1A and 4, the capstan motor 8 is rotated and outputs its rotational force through the capstan shaft 9. As a result, the capstan shaft 9 and the pinch holier 10 compressing each other with the tape passing therebetween rotate in opposite directions and make the tape be fed toward the take-up reel table 12 of the slide base 2. At the same time of feeding of the tape, the rotational force of the capstan motor 8 is also transmitted to the take-up reel table 12 through the idle mechanism 50, thereby rotating the take-up reel table 12 clockwise to wind the tape around the take-up reel of the tape cassette.

When the take-up reel table 12 starts to be rotated clockwise to wind the tape around the take-up reel of the tape cassette, the clutch gear 41 is rotated counterclockwise and results in counterclockwise rotation of the take-up reel brake 40 about the shaft 40' caused by the clutching force of the clutch gear 41. Therefore, the latch 40a of the take-up reel brake 40 escapes from the engagement with the reel gear of the take-up reel table 12, thereby releasing the take-up reel table 12. At this time, the take-up reel brake 40 is maintained at a predetermined position by the slit 2c of the slide base 2 and the latch 40a of the brake 40 is spaced apart from the take-up reel table 12 by a predetermined distance.

In order to change the playback mode into a reversed running mode, such as a review mode, the capstan motor 8 is rotated in the reversed direction and causes the tape to run in the reversed direction. At this time, the rotational force of the capstan motor 8 is transmitted to the tape supply reel table 11 of the slide base 2 through the idle mechanism 50 engaging with the intermediate gear train 52 of the supply reel table 11. The tape supply reel table 11 is thus rotated counterclockwise and rewinds the tape around the tape supply reel of the tape cassette while the tape take-up reel table 12 is rotated counterclockwise to unwind the tape from the tape take-up reel.

When the take-up reel table 12 is rotated counterclockwise in the reversed running mode as described above, the clutch gear 41 cooperating with the take-up reel table 12 is rotated clockwise to make the take-up reel brake 40 be rotated clockwise about the shaft 40'. The latch 40a of the take-up reel brake 40 thus engages with the reel gear 13 of the take-up reel table 12 and brakes the reel table 12. At this time, the take-up reel table 12 is applied with the frictional force of a friction clutch, interposed between the reel table 12 and the reel gear 13, thereby imparting a backward tensile force to the tape running in the reversed direction. In this regard, the stabilization of the running tape is achieved.

Figure 6A:
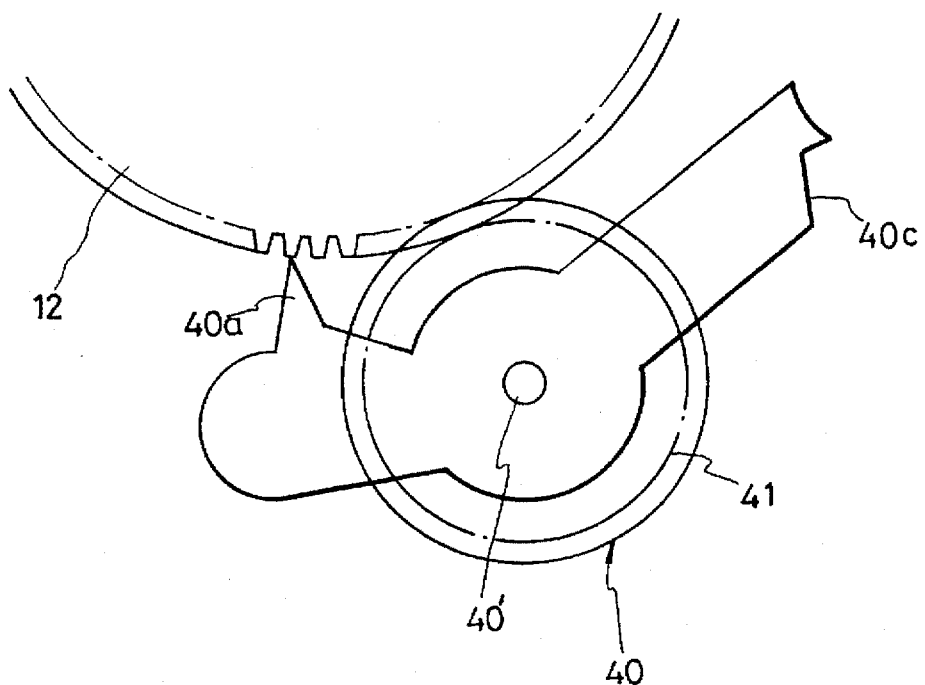
Figure 6B:
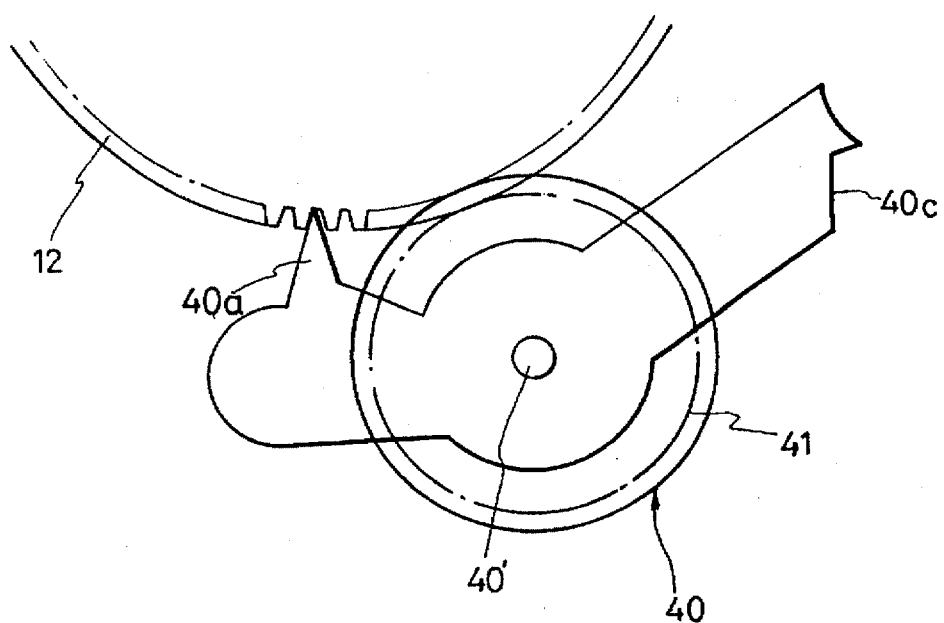

On the other hand, the latch 40a of the take-up reel brake 40 may not engage with a bottom of thread of the reel gear 13 but engage with a top of thread of the reel gear 13 as shown in FIG. 6A. In this case, the take-up reel brake 40 is not rotated at once but slips at its latch 40a on the top of the thread in a moment. After the instantaneous slip of the latch 40a on the top of thread, the take-up reel brake 40 is rotated about the shaft 40' clockwise such that its latch 40a engages with the bottom of thread between the top of thread and a next top of thread as shown in FIG. 6B.

Conventionally, it is noted that the tape may stray from the predetermined tape running path when there occurs the aforementioned instantaneous slip of the latch 40a of the take-up reel brake 40 on the top of thread of the reel gear 13 in the case of reversed running mode. That is, such a slip of the latch 40a on the top of thread causes the reel gear 13 not to be stopped at once, thereby imparting no backward tensile force to the tape and resulting in loosening of the tape. The loosened tape is apt to free from varieties of guide members, such as the slant posts and the rollers, thereby straying from the predetermined tape running path.

However, in accordance with the present invention, when letting the rotating angle of the reel gear 13 be $\Theta_1$, the rotating angle of the take-up reel brake 40 be $\Theta_2$, the radius of the pitch circle (defined by a dotted line) of the reel gear 13 be $R_1$ and the radius of the pitch circle of the take-up reel brake 40 be $R_2$ in the case of rotating-directional conversion of the take-up reel table 12 from the clockwise direction to the counterclockwise direction as shown in FIG. 5, the reel gear 13 and the take-up reel brake 40 are constructed under the designing condition represented by the relation of $\Theta_1:\Theta_2=R_2:R_1$. When the reel gear 13 and the take-up reel brake 40 are specifically constructed as described above, the latch 40a of the brake 40 is prevented from slipping on the top of thread of the reel gear 13 but always precisely engages with the bottom of thread of the reel gear 13. Thus, the take-up reel brake 40 stops the reel gear 13 without failure at the initial stage of the reversed running mode, such as the review mode, thereby stabilizing the tape running state.

Figure 7:
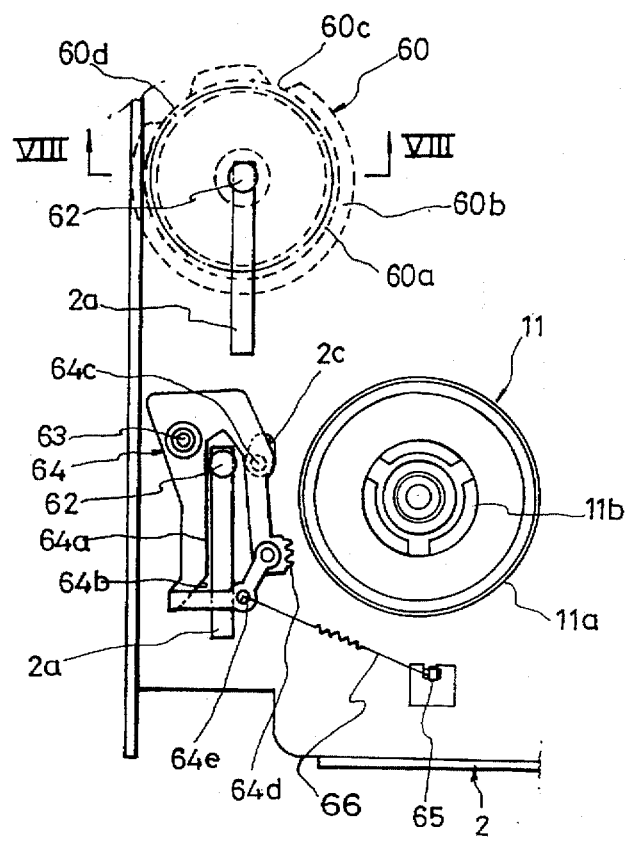
FIG. 7 is a plan view showing a sliding start stage of a supply reel brake unit in accordance with another embodiment of the present invention.
Figure 8:
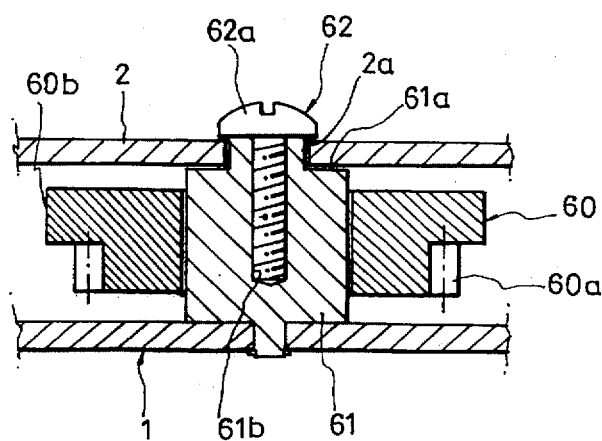
FIG. 8 is a sectional view of a drive cam gear part of the tape supply reel brake unit taken along the section line VIII—VIII of FIG. 7.

Referring to FIG. 7, there is shown in a plan view a supply reel brake unit in accordance with a second embodiment of the present invention. FIG. 8 shows a drive cam gear of the supply reel brake unit taken along the section line VIII—VIII of FIG. 7. As shown in these drawings, a pair of support shafts 61 are provided at the front and at the rear of the stationary base plate 1, respectively. In addition, a guide screw 62 screws on the top of each of the support shafts 61. The support shaft 61 is provided at its upper section with a circular stepped shoulder 61a and at the center thereof with an inner threaded vertical hole 61b adapted for receiving the guide screw 62.

The support shafts 61 are received by individual guide slits 2a, respectively provided at the front and at the rear of the slide base 2, and each receives the guide screw 62 by the inner threaded vertical hole 61b such that the slide base 2 is linearly reciprocated under the guide of the support shafts 61. When the slide base 2 is movably mounted on the stationary base plate 1 by the support shafts 61 and the guide slits 2a receiving the shafts 61, the heads 62a of the guide screws 62 screwing on the tops of the shafts 61 prevent the slide base 2 from unconscious separation from the stationary base plate 1.

The drive cam gear 60 is rotatably mounted about the rear-side support shaft 61 as best seen in FIG. 8. In addition, the supply reel brake unit further includes a supply reel brake 64 which is adapted for selectively braking the tape supply reel table 11 and rotatably mounted on the slide base 2 at a side of the tape supply reel table 11 such that it is rotated about a shaft pin 63. The supply reel brake 64 is biased by a biasing member.

The drive cam gear 60 is provided at its lower section with a smaller diameter gear section 60a and at its upper section with a larger diameter cam 60b. The larger diameter cam 60b includes a pair of notches, that is a first notch 60c and a second notch 60d.

The supply reel brake 64 is provided with a rotation limit surface 64a which comes into contact with the front-side guide screw 62 to limit the rotation of the supply reel brake 64. This limit surface is a linear surface and extends to a lock release guide surface 64b which is adapted for releasing the locked state of the supply reel brake 64. The supply reel brake 64 further includes a guide pin 64c, which is provided at the lower surface of the brake 64 and inserted in a guide slit 2c of the slide base 2, and a brake gear section 64d gearing into the reel gear 11a provided under a reel body 11b of the tape supply reel table 11. In order to support one end of the biasing member, the supply reel brake 64 has a support hole 64e.

In accordance with the embodiment of FIG. 7, the biasing member preferably comprises a tension coil spring 66 connected at its opposite ends to the support hole 64e of the brake 64 and to a support member 65 mounted on a predetermined position of the slide base 2, respectively, and biasing the supply reel brake 64 counterclockwise. However, it should be understood that there exist a variety of different biasing member configurations which yield the same result as that described for the tension coil spring 66 without affecting the functioning of this invention.

In FIG. 7, the supply reel brake unit according to the second embodiment is located on a loading start position. In this position, the slide base 2 is located on the fully pulled position with respect to the stationary base plate 1. At this position, even though the supply reel brake 64 is applied with a restoring force of the tension coil spring 66, it is limited in its rotation because its rotation limit surface 64a is comes into contact with the front-side guide screw 62 of the stationary base plate 1. Thus, the brake gear 64d of the supply reel brake 64 does not gear with the reel gear 11a of the tape supply reel table 11.

Figure 9:
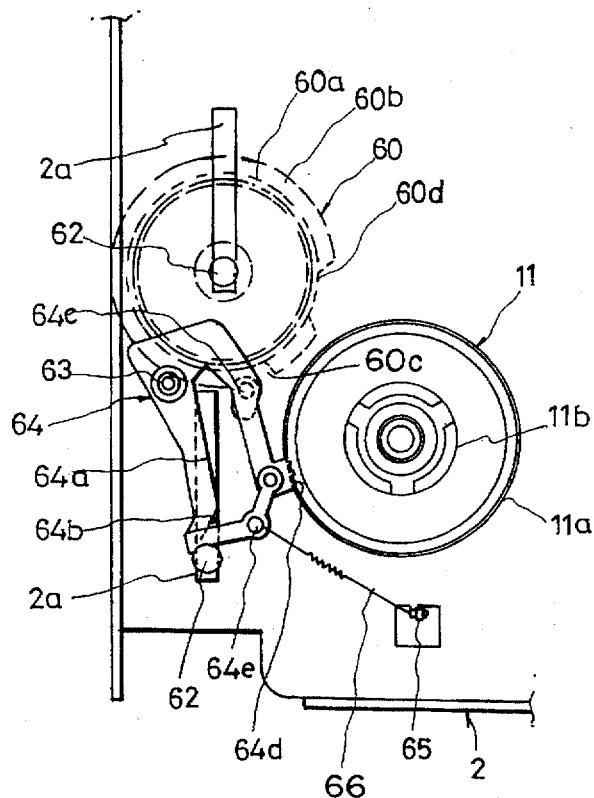

When the loading gears 6 are rotated by the rotational force of the loading motor, the slide base 2 linearly moves backwards with respect to the stationary base plate 1 under the guide of the support shafts 61 of the base plate 1. As shown in FIG. 9, the front-side guide screw 62 is located near the front end of the guide slit 2a of the slide base 2 just before reaching the loading end position of the slide base 2. The front-side guide screw 62 is thus separated from the rotation limit surface 64a of the supply reel brake 64, so that the reel brake 64 is rotated counterclockwise about the shaft pin 63 by the restoring force of the tension coil spring 66. The lock release guide surface 64b of the brake 64 is guided under the condition of elastic contact with the front-side guide screw 62. The brake gear 64d of the supply reel brake 64 gears with the reel gear 11a of the tape supply reel table 11, thereby braking the reel table 11.

At this position, the guide pin 64c of the supply reel brake 64 is received by the first notch 60c of the cam 60b of the drive cam gear 60.

Figure 10:
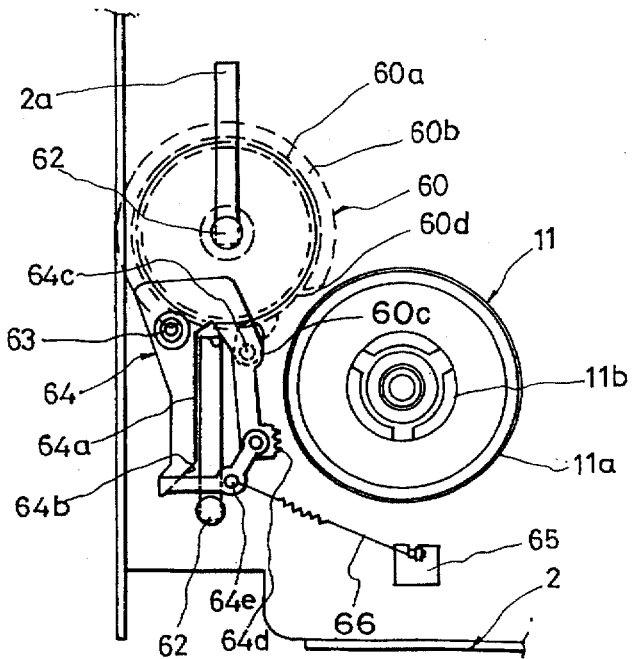

A continued backward movement of the slide base 2 with respect to the stationary base plate 1 makes the slide base 2 be located on the loading end position as shown in FIG. 10. At this loading end position, the drive cam gear 60 is rotated clockwise at a rotational angle such that the cam 60b of the drive cam gear 60 pushes the guide pin 64c of the reel brake 64. Hence, the supply reel brake 64 is rotated clockwise about the shaft pin 63 while overcoming the spring force of the tension coil spring 66, thereby separating the brake gear 64b of the brake 64 from the reel gear 11a of the tape supply reel table 11 and releasing the reel table 11.

Figure 11:
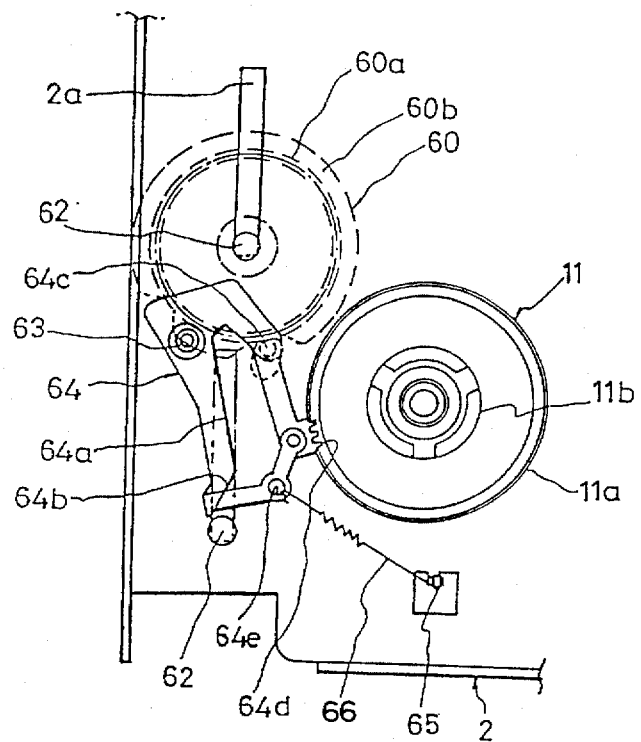

When the drive cam gear 60 is rotated clockwise in order to change the mode into the power save mode, the guide pin 64c of the supply feel brake 64 is received by the second notch 60d of the cam 60b as shown in FIG. 11. The supply reel brake 64 is rotated counterclockwise about the shaft pin 63 by the restoring force of the tension coil spring 66, thereby causing the brake gear 64b of the Feel brake 64 to gear with the reel gear 11a of the tape supply reel table 11 and braking the reel table 11.

Figure 12:
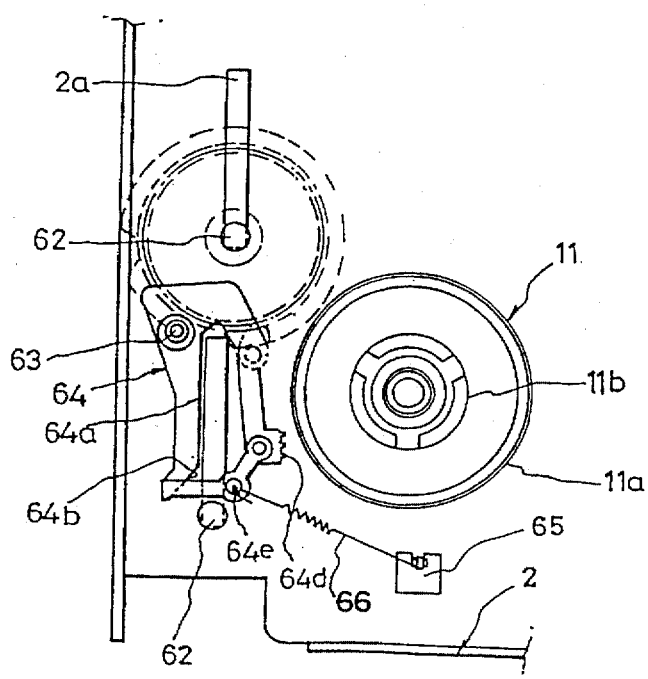

When the mode is changed from the power save mode into the playback mode as shown in FIG. 12, the drive cam gear 60 is rotated clockwise such that the cam 60b of the drive cam gear 60 pushes the guide pin 64c of the reel brake 64. Hence, the supply reel brake 64 is rotated clockwise about the shaft pin 63 while overcoming the spring force of the tension coil spring 66, thereby separating its brake gear 64b from the reel gear 11a of the tape supply reel table 11 and releasing the reel table 11.

As described above, the supply reel brake unit according to the second embodiment of the present invention includes the integrated type supply reel brake suitable for performing varieties of functions, thereby simplifying the construction. Thus, the brake unit of the second embodiment improves assembly ability and productivity and achieving the recent trend of compactness, and reducing the manufacturing cost.

The brake device of the present invention is thus particularly efficiently adapted to a compact product, such as an 8 mm camcorder.

The supply reel brake of the present invention is provided with a rotational limit lever such that, during a tape loading operation, the supply reel brake is prevented from rotation in the range of contact of the rotation limit lever of brake with a guide pin of the stationary base plate, thereby releasing the tape supply reel table. In addition, the brake device of the present invention includes a take-up reel brake unit which is designed to cause a latch of the take-up reel brake to engage with the reel gear of the tape take-up reel table without failure in a reversed running mode, such as the review mode. Hence, the present invention makes the tape be always imparted with a backward tensile force at the initial stage of the reversed running mode, such as the review mode, thereby preventing straying of the tape from the predetermined running path and damage of the tape.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A brake device for a magnetic recording and reproducing apparatus, comprising:

a clutch gear rotatably mounted on a shaft of a slide base of a deck mechanism of said apparatus to engage with a reel gear of a tape take-up reel table;

a reel brake rotatably mounted on a shaft of said clutch gear, said reel brake being provided at a first end thereof with a rotation limiting lever for limiting a rotation of said reel brake in cooperation with the deck mechanism;

a latch provided at a second end of said reel brake to selectively engage with said reel gear so as to brake the take-up reel table; and a stop pin mounted on a lower surface of the second end of said reel brake, said stop pin cooperating with a slit of said slide base so as to separate said latch from said reel gear, wherein said reel gear and said reel brake are constructed under a design condition represented by the following relation:

$$\theta_1:\theta_2=R_2:R_1$$

wherein $\theta_1$ is a rotating angle of said reel gear, $\theta_2$, is a corresponding rotating angle of said take-up reel brake cooperating with said reel gear, $R_1$ is a radius of a pitch circle of said reel gear, and $R_2$ is a radius of a pitch circle of said take-up reel brake.

2. A brake device according to claim 1, further comprising:

a clutch spring being mounted on a top of said reel brake.

3. A brake device according to claim 2, further comprising: a cap mounted on an upper section of the shaft of the slide base.

4. A brake device according to claim 3, wherein said rotation limiting lever cooperates with a guide pin of a stationary base plate of the deck mechanism to limit the rotation of said reel brake.

5. A brake device according to claim 1, wherein said reel brake is rotated by a motor in a same direction as said clutch gear.

6. A brake device according to claim 5, wherein said stop pin is received by the slit formed on the slide base to limit a rotating range of said reel brake based on a predetermined range.

7. A brake device according to claim 6, wherein said reel gear has a teeth section for receiving said latch therein.

8. A brake device for a magnetic recording and reproducing apparatus, the brake device comprising:

a reel brake for a tape take-up reel table, rotatably mounted on a shaft of a clutch gear of said apparatus, said reel brake including a latch provided at one end thereof; and a reel gear for the tape take-up reel table, the reel gear having teeth for engaging with the latch of the reel brake, wherein the reel gear and the reel brake are constructed to satisfy the following condition:

$$\theta_1:\theta_2=R_2:R_1$$

wherein $\theta_1$ is a rotating angle of the reel gear, $\theta_2$ is a corresponding rotating angle of the reel brake cooperating with the reel gear, $R_1$ is a radius of a pitch circle of the reel gear, and $R_2$ is a radius of a pitch circle of the reel brake.

9. A brake device according to claim 8, further comprising:

a stop pin mounted on a lower surface of the another end of the reel brake, said stop pin cooperating with a slit of a slide base of said apparatus so as to separate the latch of said reel brake from the reel gear.

10. A brake device according to claim 9, further comprising:

a clutch spring being mounted on a top of said reel brake.

11. A brake device according to claim 10, further comprising:

a cap mounted on an upper section of a shaft of the slide base.

12. A brake device according to claim 11, wherein said reel brake includes a rotation limiting lever provided at another end thereof, said rotation limiting lever cooperating with a guide pin of a stationary base plate of a deck mechanism of said apparatus so as to limit the rotation of said reel brake.

13. A brake device according to claim 9, wherein said stop pin is received by the slit formed on the slide base to limit a rotating range of said reel brake based on a predetermined range.

14. A brake device according to claim 8, wherein said reel gear has a teeth section for receiving the latch of said reel brake therein.

15. A brake device according to claim 8, wherein said reel brake is rotated by a motor in a same direction as the clutch gear.

* * * * *